Patented May 13, 1952

2,596,235

UNITED STATES PATENT OFFICE 2,596,235

TERPENE-PHENOLIC REACTION PRODUCT

Lyle M. Geiger, Edgewood, Pa., assignor to The Neville Company, Pittsburgh, Pa., a corporation of Pennsylvania No Drawing. Application October 2, 1947, Serial No. 777,594

7 Claims. (Cl. 260—619)

This invention relates particularly to a novel product made by the interaction of ordinary phenol and natural cyclic terpenes and which is characterized by reactivity with drying oils and by alcohol solubility, and this application is a continuation-in-part of my copending application Serial No. 561,818, filed November 3, 1944, now abandoned.

Terpene-phenol resins have been used widely in paints, varnishes, lacquers, adhesives, and other coating compositions. The practice in making such resins has been to treat a mixture of a terpene and a phenol with a catalyst that promotes condensation and polymerization reactions. A wide variety of terpenes have been used for this purpose such, for example, as alpha pinene, beta pinene, limonene, dipentene, and turpentine or turpentine fractions. Similarly, various phenols have been applied to this end, examples being ordinary phenol, cresols, the naphthols, and various substituted phenols. The catalysts that have been used for this purpose include various acids, such as sulfuric, oxalic, phosphoric, and sulfonic acids; metallic chlorides such as those of zinc, aluminum or iron; the halogens; and boron trifluoride, either as such or in the form of molecular compounds with organic acids, ethers, alcohols or phenols.

The resins produced in that manner are all characterized by solubility in aromatic hydrocarbon solvents, and they show a wide variety of properties, ranging from oily liquids to hard, brittle resins. Disadvantageously, however, all of them are insoluble in alcohols, such as methanol, ethanol, propanol, and the like, and they tend to be quite dark colored. Likewise, they are not reactive with drying oils.

A primary object of the present invention is to provide a novel reaction product of ordinary phenol ($C_6H_5OH$) and natural cyclic terpenes that is characterized by the capability of existing in both a stable, crystalline state and also in a metastable resinous state, by being soluble in alcohol, and by unique reactivity with drying oils to provide varnish and related coating compositions of especially desirable properties, both technical and economic.

A further object is to provide a simple and efficacious method of making the product of the product of the foregoing object.

Other objects will appear hereinafter.

The term "solubility in alcohol" as used herein and in the claims refers to the ability to cool a 20 per cent by weight solution of the material in anhydrous methyl, ethyl, propyl or isopropyl alcohol to 5° C. without precipitation. The 20 per cent concentration refers, of course, to a solution containing that amount of solute at normal room temperatures. This standard is applied because experience has shown that a mere trace of alcohol-insoluble polymer material will be precipitated under these conditions.

The foregoing objects of the invention are attained, as I have discovered, by effecting reaction between a natural cyclic terpene and ordinary phenol, under the influence of a condensation catalyst while observing certain critical factors. A variety of condensation catalysts, such as those well known in the art, examples of which will appear hereinafter, may be used, depending on the mol ratio of phenol to terpene. A feature is that the phenol is to be used in at least slight molar excess over the terpene; excess of phenol over that proportion may be, and for certain purposes is preferably, used. As I have discovered, the use of a molar excess of natural cyclic terpene reduces the alcohol solubility of the products.

I have discovered, and the invention is predicated in part on this also, that it is essential to all of the embodiments of the invention to add the terpene, preferably slowly and progressively, to a previously prepared mixture, suspension, dispersion or solution of the condensation catalyst in phenol, heated to an appropriate temperature. Other ways, or orders, of mixing the reactants and the catalyst result in products of impaired alcohol solubility. Thus, mixing the reactants and catalyst in the required quantities and heating, or adding the catalyst at once or in portions, to a mixture of the reactants, results in products of very poor or nil alcohol solubility, and the unique product of the invention is not produced.

The terpene may be added to a simple suspension or solution of the catalyst in the phenol. However, in some instances the viscosity of the reaction body may rise rapidly as the concentration of reaction product increases with the necessity for using excessive power to maintain the agitation necessary for adequate distribution of the catalyst. Such increase in viscosity likewise may make separation of the catalyst from the reaction body difficult. Generally speaking, therefore, it is preferable to use an inert diluent such, for example, as petroleum benzine or an aromatic hydrocarbon solvent. The phenol may be initially dissolved in such a diluent and the catalyst suspended or dispersed in the solution. Or, if preferred, the diluent may be added, all at once, or progressively, as the reaction proceeds or after it has been completed.

After the reaction has been completed the catalyst is separated, suitably by filtration, and the reaction product is recovered as described hereinafter, as exemplified by the various examples.

More in detail, the novel product that constitutes an outstanding feature of the invention and which is reactive with the drying oils, is soluble in alcohol by the test described above, and shows the rather unusual property of existing reversibly in both the crystalline and also a resinous form.

In this invention ordinary phenol is reacted with a natural cyclic terpene, using at least a slight molar excess of phenol and a condensation catalyst. With about 1.1 mol, or slightly more, of phenol per mol of terpene this oil-reactive product is produced preferably by activated clay condensation catalyst such, for example, as that sold as "Superfiltrol."

The commercially available activated clays contain appreciable quantities of water in the as-received condition, and it is essential to this aspect of the invention that these activated clays be used in that normal moist, or wet, condition. That is, if they are subjected to artificial drying prior to use they do not produce the desired alcohol-soluble and oil-reactive product because in that case they preferentially produce simple polyterpene polymers so that the primary phenolic modification reaction suffers, with consequent impairment of alcohol solubility and oil reactivity.

I find that for many purposes the use of such moist activated clay in an amount approximately 10 per cent by weight of the terpene used suffices to produce satisfactory results. As is usually the case, however, appreciable variations in the amount of catalyst used are permissible without influencing greatly the properties of the final product. Of course, there should be enough catalyst to produce the desired product at an economically satisfactory rate; likewise, too much catalyst is undesirable, economically, because it merely adds to the cost of the product.

My tests show that other condensation catalysts, typified by those known in the art, may be used with higher mol ratios of phenol to the terpene. Thus, at ratios of 2 mols or more, say 3 or 4 mols, of phenol to terpene, there may be used the various Friedel-Crafts catalysts such, for example, as aluminum chloride, zinc chloride and other metallic chlorides, or acids, e. g. sulfuric acid, that act as condensing agents. At these higher mol ratios the best results are to be had, however, by the use of boron trifluoride or any of the wide variety of its molecular complexes with ethers, esters, organic acids and phenols. These complexes are equivalent to each other in being merely carriers of $BF_3$; inert solvents for $BF_3$ might be used but they give off corrosive fumes.

As an example, the novel alcohol soluble and oil reactive product of this invention may be produced from ordinary phenol and alpha pinene by observing the factors described above. Instead of alpha pinene, any of the other natural cyclic terpenes and their derivatives, or naturally occurring combinations of such terpenes, may be used. Thus beta pinene, the gum, wood or sulphate turpentines of commerce, which are mixtures of the stated natural cyclic terpenes, and dipentene are typical of the raw materials advantageously used in the preparation of this oil reactive product.

The temperature of the reaction varies with the catalyst used, suitably from 45° to 65° C. with boron trifluoride and its active complexes to from 80° to 110° C. with activated clays; it may vary also with the terpene, e. g., with pure compounds such as alpha or beta pinene lower temperatures suffice than with mixtures of natural terpenes, such as turpentines, which in some instances may be reacted at, e. g., 150° to 180° C. Although the temperature applied is not critical, generally speaking, low temperatures result in low reaction speed while excessively high temperatures may cause the product to be darker than is the case with lower temperatures.

The product may be recovered as a resinous body by distilling off solvent, if used, and residual unreacted phenol and terpene. In trying to purify the product by recrystallization from aromatic hydrocarbons, or from mixtures of aromatic and aliphatic hydrocarbons, it was found that the compound does not always crystallize readily from these solutions, and that when forced out of solution by the addition of larger quantities of low-boiling petroleum hydrocarbons, the compound is precipitated in the form of a soft, resinous, noncrystalline mass, from which it is very difficult to obtain pure crystals, even after standing at low temperatures. I have found, however, that the compound of my invention is very readily crystallized from mixtures of dilute ethyl alcohol, e. g., equal parts of ethanol and water, and very pure products, forming perfectly white crystals of sharp melting point (98° C.) are obtained after repeated crystallizations. Another simple process for obtaining pure crystals from a mixture containing the product in impure form is to extract the resinous mixture with a dilute aqueous alkali solution and to precipitate the compound by the addition of dilute hydrochloric acid, followed by recrystallization from dilute alcohol. Similarly, when the crystalline product is heated above the melting point, recrystallization does not occur readily upon cooling, but super-cooled melts appear to exist for long periods of time, in a metastable, resinous form, without showing crystallization phenomena. The product is thus obtainable in metastable, resinous and in stable, crystalline form, convertible one to the other.

The same melting point (98° C.) has been obtained by reacting a number of natural cyclic terpenes with phenol, using various catalysts, thus showing identity of the products obtained, and as far as I am aware it is produced from any natural cyclic terpene.

An elementary analysis carried out on a purified product made from phenol and alpha pinene pointed to the formula $C_{11}H_{14}O$, corresponding to the simplest molecular weight of 162. From the freezing point depression in benzene a molecular weight of 325.0 was calculated. This made it apparent that two phenol molecules had condensed with a single terpene molecule, and from its properties as well as from its formation reactions, I consider the product to be cis 1-8 bis (parahydroxy phenyl) menthane:

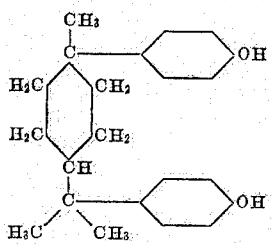

The following examples of preparing this oil reactive product of my invention are given as illustrative of practical, simple and economical ways of producing the product from readily available raw materials in commercial quantities, but are in no way restrictive.

*Example No. 1*

188 parts of phenol (1.1 mol) and 28 parts of "Superfiltrol" clay were heated at 90° to 95° C., while being agitated. 136 parts of turpentine (1 mol) dissolved in 91 parts of VM&P naphtha were added gradually over a period of 140 minutes. The reaction was permitted to continue another 60 minutes, after which the catalyst was removed by filtration. The solution was allowed to stand overnight, after which crystallization occurred. The yield obtained was 89.5 parts.

*Example No. 2*

103 parts of phenol (1.1 mol) and 15 parts of "Superfiltrol" clay were heated at 90° C., while being agitated. 136 parts of dipentene (1 mol) dissolved in 91 parts of VM&P naphtha were added gradually over a period of 2 hours. The reaction was permitted to continue for another 30 minutes, after which the catalyst was removed by filtration. The solution was allowed to stand overnight, after which crystallization occurred. The yield obtained was 55 parts.

*Example No. 3*

188 parts of phenol (2 mols) and 9.4 parts of a boron trifluoride-phenol complex containing 30 per cent by weight of BF₃ were heated at 55° C. while being agitated. 136 parts of gum turpentine (1 mol) dissolved in 9.4 parts of VM&P naphtha were added gradually over a period of 90 minutes. The reaction was continued for another 30 minutes after which the mixture was agitated with 25 parts of Attapulgus clay, a fuller's earth. The mixture was filtered and allowed to stand overnight, after which crystallization occurred. The yield obtained was 109 parts.

*Example No. 4*

188 parts of phenol (2 mols) and 10 parts of a boron trifluoride-ethyl ether complex containing 30 per cent by weight of BF₃ were heated at 55° C. 136 parts of dipentene (1 mol) dissolved in 91 parts of VM&P naphtha were added gradually over a period of 45 minutes. The reaction was allowed to continue for another 4 hours, after which 25 parts of Attapulgus clay were added. The mixture was filtered and the solution was allowed to stand overnight, after which crystallization occurred. The yield obtained was 149½ parts.

*Example No. 5*

103 parts of phenol (1.1 mol) were heated at 90° C. with 15 parts of "Superfiltrol" clay, while being agitated. 136 parts of alpha pinene (1 mol) dissolved in 91 grams of VM&P naphtha were added gradually over a period of 1 hour. The reaction was allowed to continue for another hour, after which the catalyst was removed by filtration. The reaction mixture was subjected to steam distillation and the resultant resinous product was dissolved in benzene and allowed to stand overnight, after which crystallization occurred. Total yield 29 parts.

*Example No. 6*

103 parts of phenol (1.1 mol) were heated at 90° C. with 15 parts of "Superfiltrol" clay, while being agitated. 136 parts of beta pinene (1 mol) dissolved in 91 parts of VM&P naphtha were added gradually over a period of 2 hours. The reaction was allowed to continue for an additional 30 minutes. The catalyst was then removed by filtration and the solution subjected to steam distillation. The resultant resinous product was dissolved in benzene and allowed to stand overnight, after which crystallization occurred. The total yield was 44 parts.

Similar results are obtainable from larger scale operation.

*Example No. 7*

1342 pounds of phenol, 715 pounds of petroleum benzine as a diluent, and 175 pounds of "Superfiltrol" clay were heated, with agitation, at 80° to 90° C. while adding 1943 pounds of alpha pinene over a period of 8¾ hours. Agitation and heating at the temperature stated were continued for 2½ hours longer. Upon filtration and distillation to remove unreacted materials and the diluent there were obtained 1948 pounds of product of which 507 pounds were a resin of 96° C. melting point (cube-in-mercury), of a pale color, and soluble in isopropanol without precipitation at 3° C. The remainder was 1441 pounds of a methanol-soluble steam distillable oil which boiled entirely above 300° C. at atmospheric pressure and had a specific gravity of 0.998 at 30.6/15.6° C.

*Example No. 8*

In this case 744 pounds of phenol, 387 pounds of petroleum benzine diluent, and 125 pounds of "Superfiltrol" were heated and agitated as before while adding 1155 pounds of alpha pinene during 2½ hours. Resin and oil were obtained as before. The resin weighed 441 pounds, showed a melting point of 107° C., was of pale color, and was soluble in isopropanol without precipitation at 3° C. The oil weighed 850 pounds, distilled wholly above 300° C. at atmospheric pressure, was soluble in methanol, and had a specific gravity of 0.935 at 30.6/15.6° C.

In the foregoing examples the clay catalyst was used in its as-received, moist condition.

The reaction product produced in accordance with the foregoing embodiment and examples is soluble in alcohols according to the test described above, as well as in aromatic hydrocarbons, and in dilute aqueous solutions of alkalies. It is, however, insoluble in low boiling petroleum hydrocarbons, such as petroleum ether and petroleum benzine. Likewise, when recovered in the form of resin it is convertible, as described above, to the thermodynamically stable crystalline state.

This novel product is insoluble in drying oils, but an important and unique characteristic is that it will react chemically with drying oils upon heating the mixture at a suitably elevated temperature. The thus modified drying oils acquire thereby very valuable new properties, making it possible to provide improved varnishes, lacquers, paints and the like coating materials, as described more fully in a copending application directed thereto, Serial No. 777,593, filed October 2, 1947, now U. S. Patent 2,588,821, issued March 11, 1952. It is also possible to condense this condensation product further with formaldehyde to produce valuable resins.

A considerable variety of drying oils, typified by linseed, oiticica, tung (China-wood), sunflower, dehydrated castor oils, and other drying oils used for making coating compositions may be modified chemically by reaction at elevated temperatures with the aforesaid cis 1-8 bis (parahydroxy phenyl) menthane to provide products that may be formulated into coating compositions that are characterized by highly improved characteristics. The exact temperature necessary for reaction varies with the drying oil used. When properly processed in this way the reaction product is a perfectly homogeneous liquid that is productive of films of similar characteristics and which is productive of coating formulations of greatly improved characteristics, now to be described.

The reaction product is worked up in accordance with standard practice, as by the addition of any of the various resins used for such purposes, and this may be done before or after the reaction, the product is worked to desirable consistency by the addition of any of the solvents, or volatile thinners, or combinations of them, commonly used in varnishes and related compositions. Properly cooked drying oil bases produced in this way by reaction with the aforesaid menthane derivative will stand dilution with mineral spirits to non-volatile contents as low as 30 per cent and subzero temperatures without precipitation.

Experience has shown that although small proportions of the cis 1-8 bis (parahydroxy phenyl) menthane relative to the drying oil are effective to produce substantial improvement of film properties, the optimum improvement is had in general at about 8.6 per cent by weight of the menthane derivative, based upon the oil, and that this amount should not be substantially exceeded.

An outstanding feature is that of strong fortification of the drying oil as a result of the reaction described. In fact, dry films of compositions made from this reaction product of drying oil and the menthane derivative behave as though they contain from 40 to 100 per cent more drying oil than they actually do.

Compositions made in this manner possess other important characteristics. For instance, as compared with controls made from identical constituents but without this modification of the oil by reaction with my new menthane derivative, and varnishes made from the reaction product with drying oil show definite increase in protective life, as in resistance to water, acid and salt spray, freedom from rust, adhesion to metal, and resistance to checking. Also, improved gloss and fullness are inherent, especially on wood, in coatings made from the drying oil reaction product.

A further and particularly important feature is that compositions made from the drying oil-menthane derivative reaction product show no skinning while at the same time drying time is not impeded. And, this modification of drying oils does not result in after-yellowing; pale colored bases are produced by the reaction, and color fidelity in the formulation with pigments is assured.

As indicated above, although the maximum ratio of cis 1-8 bis (parahydroxy phenyl) menthane to drying oils is essentially the same for all of the oils, the cooking temperature varies.

The crystalline compound of my invention, as described above, may be made by procedures other than that just discussed. Such other procedures are less direct and hence less economical but they give a better insight into the chemical mechanism of its formation. Thus, by reacting cis-dipentene hydrochloride, obtained by reaction of 1-8 cineole with hydrochloric acid and acetic acid at lower temperatures, with phenol in the presence of a Friedel-Crafts catalyst such as aluminum chloride or zinc chloride, cis 1-8 bis (parahydroxy phenyl) menthane is formed, which is clearly distinguished from the considerably higher melting trans compound formed under similar conditions from trans-dipentene hydrochloride and phenol.

It is to be understood that the term "activated clay" as used in the claims refers to the clay in its commercial moist condition.

According to the provisions of the patent statutes, I have explained the principle and mode of practicing my invention, and have described what I now consider to represent its best embodiment. However, I desire to have it understood that, within the scope of the appended claims, the invention may be practiced otherwise than as specifically described.

I claim:

1. That method which comprises heating ordinary phenol ($C_6H_5OH$) in contact with a condensation catalyst, adding to the heated mixture a natural cyclic terpene, said phenol being present in molar excess over said terpene, and separating from the reaction mixture condensation product characterized by existing reversibly in a resinous form and in a crystalline form melting at 98° C. after recrystallization from alcohol, by being reactive with drying oils, and by complete solubility in alcohol as determined by the test described herein.

2. That method which comprises heating a condensation catalyst carried in a solution of ordinary phenol ($C_6H_5OH$) in an inert solvent, adding to the said heated material a natural cyclic terpene, said phenol being present in molar excess over said terpene, and separating from the reaction mixture condensation product characterized by existing reversibly in a resinous form and in a crystalline form melting at 98° C. after recrystallization from alcohol, by being reactive with drying oils, and by complete solubility in alcohol as determined by the test described herein.

3. A method according to claim 2 in which said terpene is a pinene.

4. A method according to claim 2 in which said terpene is turpentine.

5. A method according to claim 2 said catalyst being activated clay.

6. A method according to claim 2 said phenol and pinene being present in substantially 1:1 to 2:1 molar proportions, and said catalyst being boron trifluoride.

7. That method of preparing cis 1-8 bis (parahydroxy phenyl) menthane which comprises heating boron trifluoride in contact with ordinary phenol ($C_6H_5OH$), adding to the said heated material a natural cyclic terpene, said phenol and pinene being present in 1:1 to 2:1 molar proportion, and separating from the reaction mixture said menthane melting at 98° C. after recrystallization from alcohol.

LYLE M. GEIGER.

REFERENCES CITED

The following references are of record in the file of this patent:

UNITED STATES PATENTS

| Number | Name | Date |
|---|---|---|
| 1,469,709 | Wuyts | Oct. 2, 1923 |
| 2,123,898 | Honel et al. | July 19, 1938 |
| 2,129,153 | Schirm | Sept. 6, 1938 |
| 2,145,369 | Osterhof | Jan. 31, 1939 |
| 2,319,386 | Carmody | May 18, 1943 |
| 2,343,845 | Powers | Mar. 7, 1944 |

OTHER REFERENCES

Zinke et al., Jour. fur Prak. Chem., vol. 156, 97–100 (1940).

Martin, Paint Manufacture, vol. 15, 30–32 (1945).